United States Patent
Ha

(10) Patent No.: US 10,268,074 B2
(45) Date of Patent: Apr. 23, 2019

(54) BACKLIGHT ASSEMBLY AND LIQUID CRYSTAL DISPLAY DEVICE HAVING IMPROVED LUMINANCE UNIFORMITY

(71) Applicant: SAMSUNG DISPLAY CO., LTD., Yongin-si, Gyeonggi-do (KR)

(72) Inventor: Ju Hwa Ha, Asan-si (KR)

(73) Assignee: Samsung Display Co., Ltd. (KR)

( * ) Notice: Subject to any disclaimer, the term of this patent is extended or adjusted under 35 U.S.C. 154(b) by 93 days.

(21) Appl. No.: 14/931,809

(22) Filed: Nov. 3, 2015

(65) Prior Publication Data

US 2016/0223864 A1    Aug. 4, 2016

(30) Foreign Application Priority Data

Feb. 2, 2015 (KR) .................. 10-2015-0016224

(51) Int. Cl.
*G02F 1/1335* (2006.01)
*G02B 19/00* (2006.01)
*G02B 5/02* (2006.01)

(52) U.S. Cl.
CPC ..... *G02F 1/133605* (2013.01); *G02B 5/0221* (2013.01); *G02B 19/0066* (2013.01); *G02F 1/133603* (2013.01); *G02F 1/133611* (2013.01); *G02B 19/0028* (2013.01); *G02F 1/133606* (2013.01); *G02F 2001/133607* (2013.01); *G02F 2203/02* (2013.01)

(58) Field of Classification Search
CPC ................ G02F 1/133605; G02B 19/0066
See application file for complete search history.

(56) References Cited

U.S. PATENT DOCUMENTS

| | | | |
|---|---|---|---|
| 2006/0164840 A1* | 7/2006 | Song | F21V 7/00 |
| 2007/0183136 A1* | 8/2007 | Park | G02F 1/133603 |
| | | | 362/97.4 |
| 2011/0050735 A1* | 3/2011 | Bae | G02F 1/133603 |
| | | | 345/690 |
| 2011/0261286 A1* | 10/2011 | Choi | G02F 1/133603 |
| | | | 349/61 |
| 2012/0320270 A1* | 12/2012 | Takata | G02B 6/0073 |
| | | | 348/554 |

(Continued)

FOREIGN PATENT DOCUMENTS

| | | | | |
|---|---|---|---|---|
| KR | 10-2002-0096570 A | | 12/2002 | |
| KR | 10-2006-0114759 | * | 5/2005 | G02F 1/13357 |

(Continued)

OTHER PUBLICATIONS

Georg Wolfrum, "European Search Report," European Patent Application No. 16150721.5, European Patent Office, dated Jun. 13, 2016, 9 pages, Munich, Germany.

*Primary Examiner* — Sang V Nguyen
(74) *Attorney, Agent, or Firm* — Innovation Counsel LLP

(57) ABSTRACT

Disclosed herein are a backlight assembly and a liquid crystal display device including the same, which is capable of producing more uniform luminance. The liquid crystal display device includes: a backlight assembly, and a liquid crystal display panel positioned above the backlight assembly. The backlight assembly includes: reflecting sheets having a first surface roughness and a second surface roughness that are different from each other; and light source disposed adjacent to the reflecting sheets.

30 Claims, 12 Drawing Sheets

(56) References Cited

U.S. PATENT DOCUMENTS

| | | | | |
|---|---|---|---|---|
| 2013/0100648 A1* | 4/2013 | Nozawa | ............... | G09F 13/04 362/97.2 |
| 2013/0169905 A1* | 7/2013 | Ouchi | ............... | G02F 1/133603 349/67 |
| 2013/0188100 A1* | 7/2013 | Ikuta | ............... | G02F 1/00 348/739 |
| 2013/0250189 A1* | 9/2013 | Choe | ............... | G02F 1/1313 349/11 |
| 2014/0204578 A1* | 7/2014 | Kim | ............... | F21V 11/16 362/235 |
| 2014/0218625 A1* | 8/2014 | Kuromizu | ............... | F21K 9/50 |
| 2014/0321155 A1* | 10/2014 | Rho | ............... | F21V 7/0091 362/606 |
| 2015/0109559 A1* | 4/2015 | Lee | ............... | G02F 1/133606 349/67 |
| 2016/0103381 A1* | 4/2016 | Ikeno | ............... | G02F 1/19 349/58 |
| 2016/0259209 A1* | 9/2016 | Ito | ............... | G02B 5/0278 |

FOREIGN PATENT DOCUMENTS

| | | | | |
|---|---|---|---|---|
| KR | 10-2006-0114759 | * 11/2006 | ......... | G02F 1/13357 |
| KR | 2006-0114759 | * 11/2006 | ......... | G02F 1/13357 |
| KR | 10-2010-0124839 A | 11/2010 | | |
| KR | 10-2011-0022507 A | 3/2011 | | |
| KR | 10-2011-0062294 A | 6/2011 | | |
| KR | 10-2011-0139039 A | 12/2011 | | |
| KR | 10-2013-0096208 A | 8/2013 | | |
| KR | 10-2013-0126123 | * 10/2013 | ......... | G02F 1/13357 |

\* cited by examiner

BACKLIGHT ASSEMBLY AND LIQUID CRYSTAL DISPLAY DEVICE HAVING IMPROVED LUMINANCE UNIFORMITY

CROSS-REFERENCE TO RELATED APPLICATION

This application claims priority to, and the benefit of, Korean Patent Application No. 10-2015-0016224 filed in the Korean Intellectual Property Office on Feb. 2, 2015, the entire contents of which are incorporated herein by reference.

BACKGROUND (a) Technical Field

Embodiments of the present invention relate to a backlight assembly and a liquid crystal display device including the same. More particularly, embodiments of the present invention relate to a backlight assembly and a liquid crystal display device having improved luminance uniformity.

(b) Description of the Related Art

Many modern electronic devices, including computer monitors, televisions, mobile phones, and the like, employ a display device. Such display devices can be cathode ray tube display devices, liquid crystal display devices, plasma display devices, and the like.

A liquid crystal display device, which is one type of flat panel display device that has come into wide use, includes two display panels on which electric field generating electrodes such as pixel electrodes, common electrodes, and the like, are formed, and a liquid crystal layer interposed between the two display panels. The display generates an electric field in the liquid crystal layer through application of a voltage to the electric field generating electrodes, thereby determining alignment of liquid crystal molecules of the liquid crystal layer and controlling polarization of incident light to display an image.

Since the liquid crystal display device does not generate its own light, it requires a light source. Here, the light source may be an artificial light source that is separately provided, or may be natural light. Artificial light sources used in the liquid crystal display device commonly employ light emitting diodes (LEDs), cold cathode fluorescent lamps (CCFLs), external electrode fluorescent lamps (EEFLs), and the like.

The light emitting diode (LED) has many advantages, such as long lifespan, small size, low power consumption, and the like, as compared with some of the other light sources listed above. Therefore, the use of light emitting diodes (LEDs) with liquid crystal displays has recently increased. Light emitting diodes (LEDs) may be configured and arranged in a number of different ways when used to illuminate a liquid crystal display.

Particularly, within what is called a direct type display, light sources are positioned below the liquid crystal display panel. However, in this configuration, different luminances appear at portions of the liquid crystal display panel adjacent to the light source and at portions of the liquid crystal display panel distant from the light source.

The above information disclosed in this Background section is only for enhancement of understanding of the background of the invention and therefore it may contain information that does not form the prior art that is already known in this country to a person of ordinary skill in the art.

SUMMARY

Embodiments of the present invention provide a backlight assembly and a liquid crystal display device including the same, which produce more uniform luminance.

An exemplary embodiment of the present invention provides a backlight assembly including: reflecting sheets having a first surface roughness and a second surface roughness that are different from each other; and light source disposed adjacent to the reflecting sheets.

The reflecting sheets may include a first reflecting sheet and a second reflecting sheet, the first reflecting sheet may have the first surface roughness, and the second reflecting sheet may have the second surface roughness.

The second reflecting sheet may be positioned on the first reflecting sheet.

The second reflecting sheet may have a plurality of holes formed therein.

The first surface roughness may be larger than the second surface roughness.

An arithmetic average roughness of the first reflecting sheet may be about 1.0 μm or more.

A maximum height roughness of the first reflecting sheet may be about 10 μm or more.

An arithmetic average roughness of the second reflecting sheet may be about 0.1 μm or less.

A maximum height roughness of the second reflecting sheet may be about 1.5 μm or more The second reflecting sheet may have a plurality of holes formed therein.

An areal density of the holes may decrease with distance from their respective light source.

An areal density of the holes may increase with distance from their respective light source.

The holes may be positioned so that successive holes extend radially outward from their respective light source.

The holes may be arranged in groups around respective ones of the light sources.

The holes may have at least one of a circular shape, an oval shape, a triangular shape, a quadrangular shape, and a polygonal shape.

The first surface roughness may be smaller than the second surface roughness.

The backlight assembly may further include a lens positioned above each light source and enclosing each light source.

The light source may be configured to direct light in a vertical direction at least approximately perpendicular to an upper surface of the reflecting sheets, and the lens may be configured to emit the light supplied from the light source through sides thereof.

The lens may be configured to emit light supplied from the light source through an upper surface thereof.

Another exemplary embodiment of the present invention provides a liquid crystal display device including: a backlight assembly; and a liquid crystal display panel positioned above the backlight assembly; wherein the backlight assembly includes: reflecting sheets having a first surface roughness and a second surface roughness that are different from each other; and light source disposed adjacent to the reflecting sheets.

The reflecting sheets may include a first reflecting sheet and a second reflecting sheet, the first reflecting sheet may have the first surface roughness, and the second reflecting sheet may have the second surface roughness.

The second reflecting sheet may be positioned on the first reflecting sheet.

The first surface roughness may be larger than the second surface roughness.

The second reflecting sheet may have a plurality of holes formed therein.

An areal density of the holes may decrease with distance from their respective light source.

An areal density of the holes may increase with distance from their respective light source.

The first surface roughness may be smaller than the second surface roughness.

The second reflecting sheet may have a plurality of holes formed therein.

The display device may further include a lens positioned above each light source and enclosing each light source.

The light source may be configured to direct light in a vertical direction at least approximately perpendicular to an upper surface of the reflecting sheets, and the lens may be configured to emit the light supplied from the light source through sides thereof.

The lens may be configured to emit light supplied from the light source through an upper surface thereof.

As described above, a backlight assembly and a liquid crystal display device including the same according to exemplary embodiments of the present invention have the following effects.

A backlight assembly according to the present invention includes reflecting sheets having different roughnesses, thereby making it possible to allow the liquid crystal display device to project a generally uniform luminance.

In addition, a thickness of the backlight assembly may be decreased, and the number of light sources and lenses may be decreased, such that manufacturing cost may also be decreased.

DETAILED DESCRIPTION OF THE EMBODIMENTS

Figure 1:
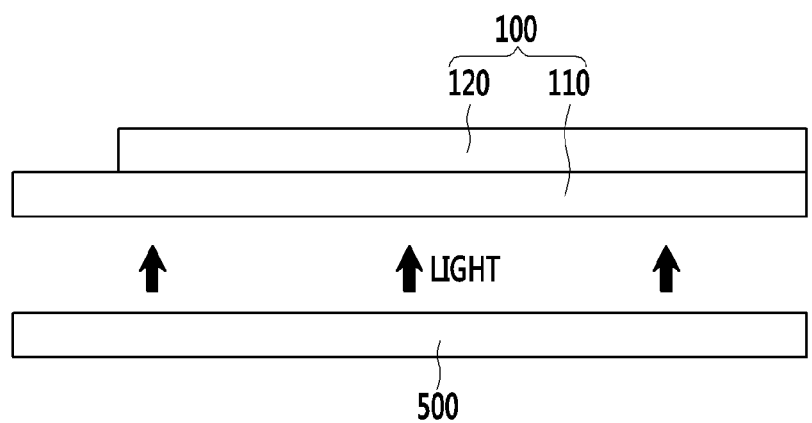
FIG. 1 is a cross-sectional view schematically illustrating a liquid crystal display device according to an exemplary embodiment of the present invention.

Hereinafter, exemplary embodiments of the present invention will be described more fully with reference to the accompanying drawings so as to be easily practiced by those skilled in the art to which the present invention pertains. As those skilled in the art would realize, the described embodiments may be modified in various different ways, all without departing from the spirit or scope of the present invention.

In the drawings, the thickness of layers, films, panels, regions, etc., are exaggerated for clarity. The various Figures are thus not to scale. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

All numerical values are approximate, and may vary. All examples of specific materials and compositions are to be taken as nonlimiting and exemplary only. Other suitable materials and compositions may be used instead.

First, a liquid crystal display device according to an exemplary embodiment of the present invention will be described with reference to FIGS. 1 to 6.

Figure 2:
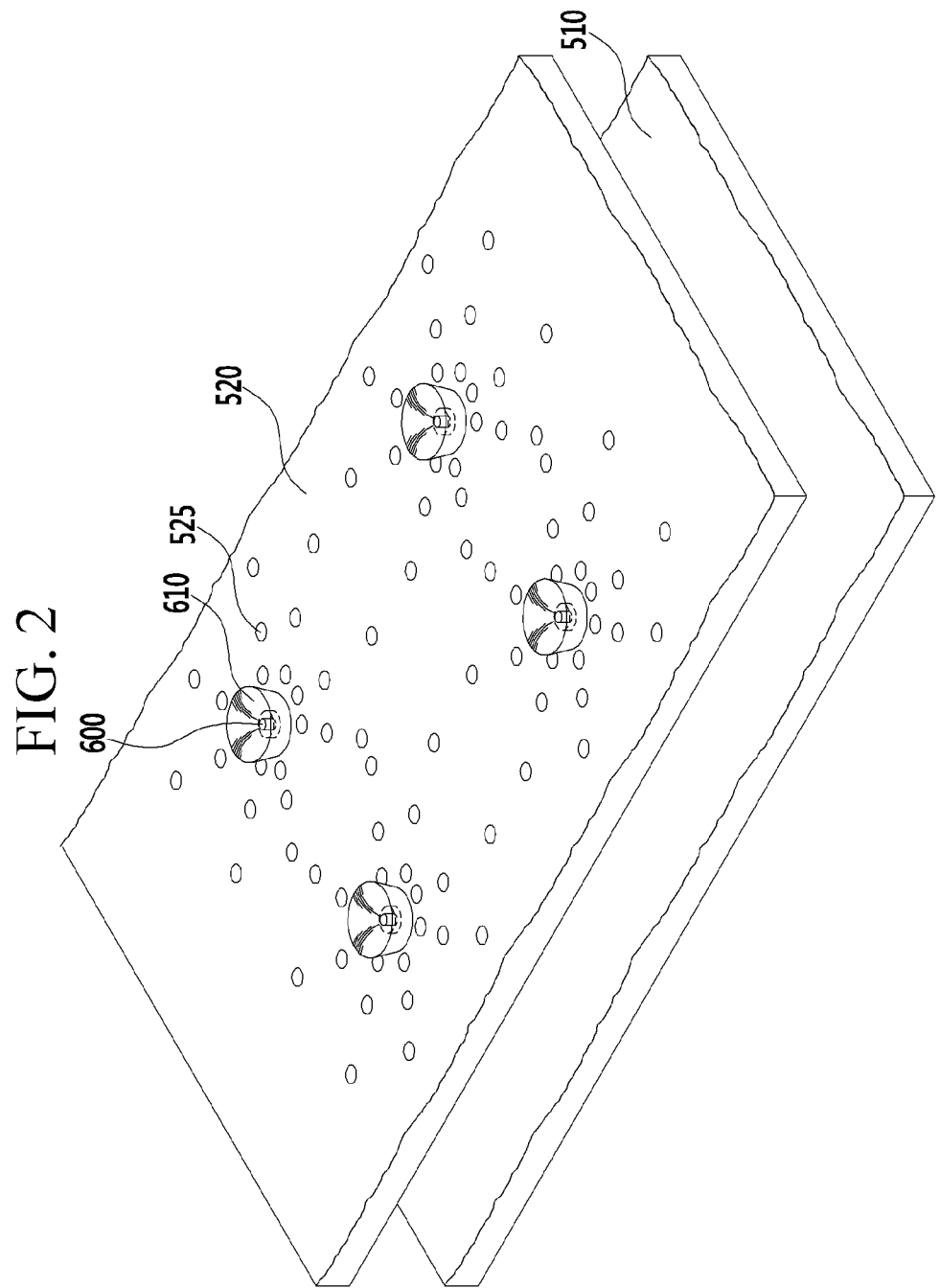
FIG. 2 is a perspective view illustrating a backlight assembly according to an exemplary embodiment of the present invention.
Figure 3:
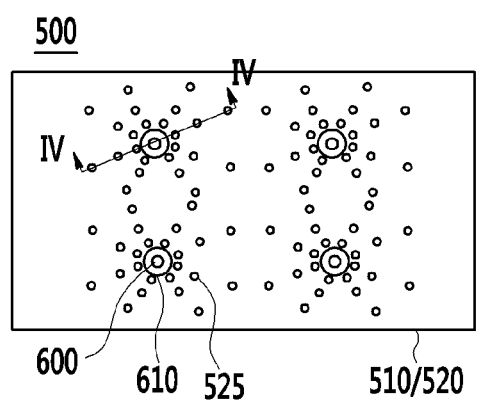
FIG. 3 is a plan view illustrating the backlight assembly according to an exemplary embodiment of the present invention.
Figure 4:
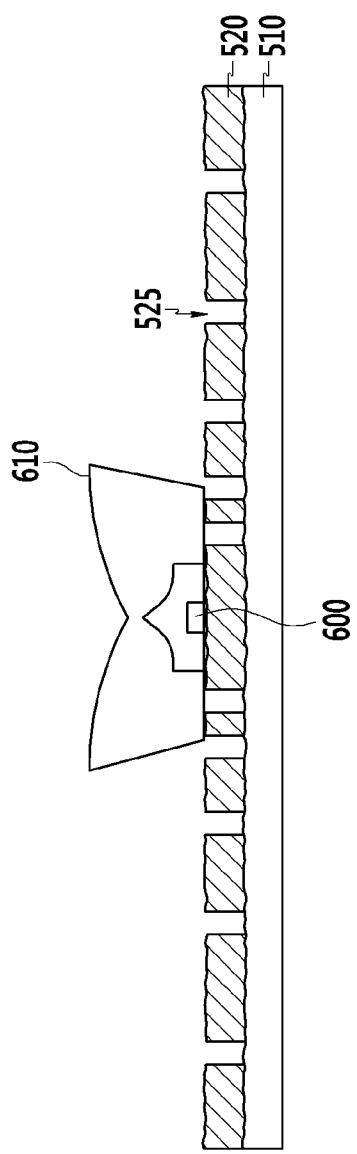
FIG. 4 is a cross-sectional view of the backlight assembly according to an exemplary embodiment of the present invention taken along line IV-IV of FIG. 3.
Figure 5:
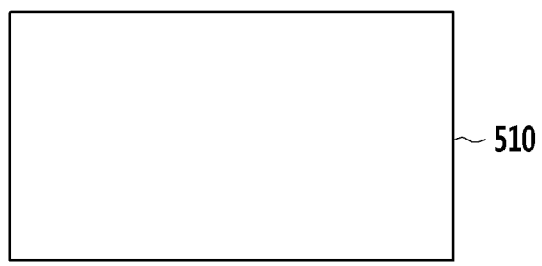
FIG. 5 is a plan view illustrating a first reflecting sheet of the backlight assembly according to an exemplary embodiment of the present invention.
Figure 6:
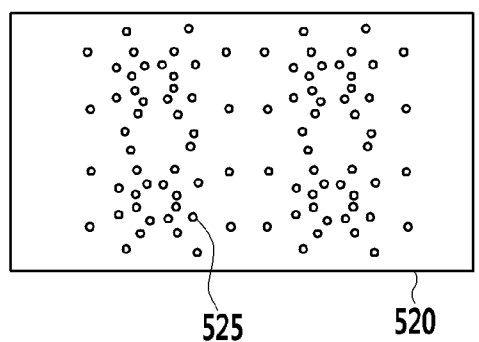
FIG. 6 is a plan view illustrating a second reflecting sheet of the backlight assembly according to an exemplary embodiment of the present invention.

FIG. 1 is a cross-sectional view schematically showing a liquid crystal display device according to an exemplary embodiment of the present invention, FIG. 2 is a perspective view showing a backlight assembly according to an exemplary embodiment of the present invention, FIG. 3 is a plan view showing the backlight assembly according to an exemplary embodiment of the present invention, and FIG. 4 is a cross-sectional view of the backlight assembly according to an exemplary embodiment of the present invention taken along line IV-IV of FIG. 3. FIGS. 2 to 4 show light sources, first and second reflecting sheets, and a lens of a backlight assembly according to an exemplary embodiment of the present invention. FIG. 5 is a plan view showing a first reflecting sheet of the backlight assembly according to an exemplary embodiment of the present invention, and FIG. 6 is a plan view showing a second reflecting sheet of the backlight assembly according to an exemplary embodiment of the present invention.

As shown in FIG. 1, the liquid crystal display device according to an exemplary embodiment of the present invention includes a backlight assembly 500 and a liquid crystal display panel 100 positioned above the backlight assembly 500.

The liquid crystal display panel 100 includes a first substrate 110 and a second substrate 120 facing each other.

The first substrate 110 and the second substrate 120 may be made of glass, plastic, or the like. First electric field generating electrodes (not shown) may be formed on the first substrate 110, and second electric field generating electrodes (not shown) may be formed on the second substrate 120.

When a predetermined voltage is applied to each of the two electric field generating electrodes, an electric field is formed between the first substrate 110 and the second substrate 120. The two field generating electrodes may also be formed on the same substrate.

Although not shown, a liquid crystal layer may be positioned between the first substrate 110 and the second substrate 120. The liquid crystal layer may be formed of a plurality of liquid crystal molecules and may be positive type or negative type liquid crystal.

The backlight assembly 500 is positioned on a rear surface of the first substrate 110 and supplies light to the liquid crystal display panel 100.

A direction of the liquid crystal molecules of the liquid crystal layer is determined depending on the electric field formed between the first substrate 110 and the second substrate 120, and an amount of light passing through the liquid crystal layer is modulated according to the direction or orientation of the liquid crystal molecules. For example, all or some of the light supplied from the backlight assembly 500 may be allowed to pass through the liquid crystal display panel 100 or all of the light supplied from the backlight assembly 500 may be prevented from passing through the liquid crystal display panel 100. An amount by which the light supplied from the backlight assembly 500 passes through the liquid crystal display panel 100 is adjusted by setting the direction of the liquid crystal molecules, thereby making it possible to display an image.

As shown in FIGS. 2 and 4, the backlight assembly 500 includes a first reflecting sheet 510, a second reflecting sheet 520, and light sources 600.

The first reflecting sheet 510 and the second reflecting sheet 520 may be positioned below the light sources 600. Most of the light emitted from the light sources 600 is directed upward, such that it directly enters the liquid crystal display panel 100, yet some of the light is emitted downward, such that it does not directly enter the liquid crystal display panel 100. The first reflecting sheet 510 and the second reflecting sheet 520 change paths of the light so that the light emitted downward is not leaked to the outside. That is, the light incident to the first reflecting sheet 510 and the second reflecting sheet 520 is reflected by the first reflecting sheet 510 and the second reflecting sheet 520 to enter the liquid crystal display panel 100.

The first reflecting sheet 510 is formed in approximately a quadrangular shape, as shown in FIG. 5. However, the shape of the first reflecting sheet 510 is not limited thereto, but may be variously modified depending on the shape of the liquid crystal display panel 100.

The second reflecting sheet 520 may be positioned on the first reflecting sheet 510. The second reflecting sheet 520 is formed in approximately a quadrangular shape, and has a plurality of holes 525 formed therein, as shown in FIG. 6.

The plurality of holes 525 are radially disposed based on predetermined points. That is, groups of holes 525 are positioned along lines radiating outward from respective central predetermined points. Here, the predetermined points may be portions at which the light sources 600 are positioned, and the plurality of holes 525 are disposed at positions extending outward from the light sources 600.

For example, the plurality of holes 525 may be disposed on a virtual circle having a first radius from the light sources 600, on a virtual circle having a second radius from the light sources 600, and on a virtual circle having a third radius from the light sources 600. Here, the first radius, the second radius and the third radius have different values. The holes 525 disposed on a plurality of circles having the first radius, the second radius, and the third radius may be positioned on the same line.

Here, distances between holes 525 positioned on the same line increase with distance from the light sources 600. For example, in the case in which the first radius is the smallest, the second radius is larger than the first radius, and the third radius is larger than the second radius, a distance between the second radius and the third radius is larger than that between the first radius and the second radius. That is, distances between the holes 525 disposed on a circle having the second radius and the holes 525 disposed on a circle having the third radius are larger than those between the holes 525 disposed on a circle having the first radius and the holes 525 disposed on the circle having the second radius. Therefore, the more distant from the light source 600, the lower the areal density of the holes 525, i.e. the number of holes per unit area.

In FIGS. 2 and 3, the holes 525 are disposed so as to be extended in eight directions from the light sources 600. However, this is merely a nonlimiting example. That is, the holes 528 may be disposed in any number of directions, eight or otherwise.

The holes 525 are formed in a predetermined shape and have sizes that are the same as, or similar to, each other. For example, the holes 525 may be circular. However, the present invention is not limited thereto. That is, the holes 525 may be formed in shapes other than circular, and different holes 525 may have shapes that differ from each other. In addition, sizes of the holes 525 may not be constant. Different holes 525 may be of different sizes.

A surface roughness of the first reflecting sheet 510 is different from that of the second reflecting sheet 520.

The surface roughness is determined by a level of fine protrusions and depressions generated on a surface of an object when processing the surface of the object. That is, the surface roughness refers to how rough or smooth the surface of the object is. The larger the numerical value of the surface roughness, the rougher the surface, and the smaller the numerical value of the surface roughness, the smoother the surface. The surface roughness, and the shape and size of surface features, are determined by factors such as the method of processing the surface, and a kind of tool used to process the surface.

A statistical value indicating a level of the surface roughness may be referred to as a roughness parameter, and Korean Standards for the roughness parameter are defined in KS B 0161. Exemplary parameters characterizing surface roughness include an arithmetic average roughness (Ra), a maximum height roughness (Rmax), a ten point average roughness, and the like. The arithmetic average roughness (Ra) refers to an average height from a center line of a measurement section (reference length) to a cross-sectional curved line. The maximum height roughness (Rmax) refers to a vertical distance between two parallel lines that are in parallel with a center line in a roughness curved line within a measurement section (reference length) and passing through the highest point and the lowest point of the curved line.

A surface roughness of the first reflecting sheet 510 is larger than that of the second reflecting sheet 520. An arithmetic average roughness Ra1 of the first reflecting sheet 510 is thus larger than an arithmetic average roughness Ra2 of the second reflecting sheet 520. In one embodiment, the arithmetic average roughness Ra1 of the first reflecting sheet 510 is about 1.0 µm or more, and the arithmetic average roughness Ra2 of the second reflecting sheet 520 is about 0.1

μm or less. As another example, a maximum height roughness Rmax1 of the first reflecting sheet 510 is larger than a maximum height roughness Rmax2 of the second reflecting sheet 520. For instance, the maximum height roughness Rmax1 of the first reflecting sheet 510 is about 10 μm or more, and the maximum height roughness Rmax2 of the second reflecting sheet 520 is about 1.5 μm or less.

One of ordinary skill in the art will observe that the present invention is not limited to the above described configurations. For instance, a surface roughness of the first reflecting sheet 510 may be smaller than that of the second reflecting sheet 520.

Next, characteristics depending on a surface roughness of a reflecting sheet will be described with reference to FIGS. 7 and 8. Description will be provided while comparing a reflecting sheet having a relatively small surface roughness and a reflecting sheet having a relatively large surface roughness with each other.

Figure 7:
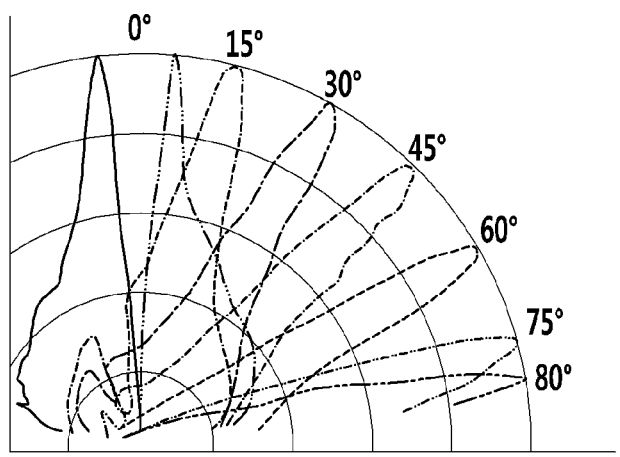
FIG. 7 is a view illustrating a bidirectional reflectance distribution function of a reflecting sheet having a large surface roughness.
Figure 8:
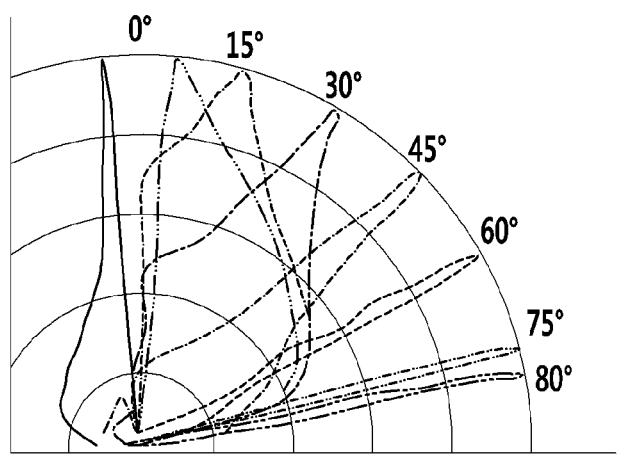
FIG. 8 is a view illustrating a bidirectional reflectance distribution function of a reflecting sheet having a small surface roughness.

FIG. 7 is a view showing a bidirectional reflectance distribution function of a reflecting sheet having a large surface roughness, and FIG. 8 is a view showing a bidirectional reflectance distribution function of a reflecting sheet having a small surface roughness. The bidirectional reflectance distribution function (BRDF) is a function describing how light is reflected from a surface. Inputs of this function are an azimuth angle and an altitude angle at which light is incident to the surface, and an azimuth angle and an altitude angle at which light is emitted from the surface. A result of the bidirectional reflectance distribution function is a unitless value that indicates a relative amount of energy reflected in a light emitting direction when a direction in which the light is incident is given. In FIG. 7, an arithmetic average roughness (Ra) of the reflecting sheet is about 1.0 μm, and a maximum height roughness (Rmax) thereof is about 10.5 μm. In FIG. 8, an arithmetic average roughness (Ra) of the reflecting sheet is about 0.12 μm, and a maximum height roughness (Rmax) thereof is about 1.26 μm.

As shown in FIG. 7, in the case of the reflecting sheet having relatively large surface roughness, uniformity of light reflectance may be increased; however, paths of the light become shorter. When the paths of the light become shorter, light sources must be disposed close to each other, which increases the number of light sources required. In addition, dark regions may be generated at corners of the reflecting sheet.

As shown in FIG. 8, in the case of the reflecting sheet having relatively small surface roughness, paths of the light become longer, such that the reflected light may arrive at distant positions, i.e. is dispersed across a larger area. Therefore, light sources may be disposed farther apart from each other, such that the number of light sources may be decreased. However, when the paths of the light become longer, a light concentration phenomenon occurs at edges of the reflecting sheet, and illumination uniformity is thus decreased.

As described above, each of the reflecting sheet having large surface roughness and the reflecting sheet having small surface roughness has advantages and disadvantages. In the backlight assembly according to an exemplary embodiment of the present invention, both a reflecting sheet having relatively large surface roughness and a reflecting sheet having relatively small surface roughness are used, thereby making it possible to counteract disadvantages of the reflecting sheet having relatively large surface roughness with a reflecting sheet having relatively small surface roughness, and to counteract disadvantages of the reflecting sheet having relatively small surface roughness with a reflecting sheet having relatively large surface roughness.

In the backlight assembly according to an exemplary embodiment of the present invention, the first reflecting sheet 510 having relatively large surface roughness may be positioned beneath the second reflecting sheet 520, and the second reflecting sheet 520 having relatively small surface roughness may be positioned on or over the first reflecting sheet 510. In addition, since the holes 525 are formed in the second reflecting sheet 520, some of the light emitted from the light sources 600 is reflected by the first reflecting sheet 510, and some of the light is reflected by the second reflecting sheet 520. Light incident to portions in which the holes 525 are not formed in the second semiconductor sheet 520 is reflected farther away, due to long paths of the light. In portions in which the holes 525 are formed, the light is incident to the first reflecting sheet 520, and the reflected light has relatively high uniformity.

Generally, hot spots that appear brighter than other portions may appear in areas close to the light sources 600. In an exemplary embodiment of the present invention, the holes 525 are disposed at a higher density in areas close to the light sources 600, so that more of the light incident to the portions close to the light sources 600 will be reflected by the first reflecting sheet 510. Since the first reflecting sheet 510 has relatively large surface roughness, the light reflected by the first reflecting sheet 510 has relatively high uniformity. That is, the light incident to the first reflecting sheet 510 is diffusion-reflected, i.e. light is reflected in a more diffuse manner, so that the appearance of a hot spot is reduced or eliminated.

In addition, generally, the more distant from the light sources 600, the smaller the amount of light seen, so that dark portions may be generated at corners of the liquid crystal display panel 100. In an exemplary embodiment of the present invention, the more distant from the light sources 600, the lower the areal density, or number of holes per unit area, of the holes 525. Therefore, the probability that light incident to portions distant from the light sources 600 will be reflected by the second reflecting sheet 520 may be increased. Since the second reflecting sheet 520 has relatively small surface roughness, light reflected by the second reflecting sheet 520 travels relatively long paths. That is, the light incident to the second reflecting sheet 520 travels longer paths, such that the generation of dark portions at or near corners of the liquid crystal display panel 100 may be prevented or reduced.

Again referring to FIGS. 2 and 4, the light sources 600 may be positioned on the second reflecting sheet 520, and lenses 610 may be positioned above the light sources. The lenses 610 may partially or fully enclose the light sources.

The light source 600 may be formed of a light emitting diode (LED). A plurality of light sources 600 is disposed on the second reflecting sheet 520. The light sources 600 are disposed at predetermined intervals, and although four light sources 600 are shown, the number of light sources 600 is not limited thereto, and may be any number. The number of light sources 600 may be variously changed depending on performance of the light sources 600, a size of the liquid crystal display panel 100, and the like. The light sources 600 may be disposed so as to emit light upward toward a top surface. The light emitted from the light sources 600 may be refracted or focused as desired, by the lenses 610.

Groove parts may be formed in bottom surfaces of the lenses 610, and the light sources 600 may be positioned in the groove parts of the lenses 610. Therefore, the light sources 600 have a form in which they are inserted into the lenses 610, and the light emitted from the light sources 600 passes through the lenses 610 and is then transferred to the outside. An outer shape of the lens 610 may be a circular cylindrical shape or a circular truncated cone shape.

A top surface of the lens 610 is not flat, but may have one or more depressions formed therein. That is, the top surface of the lens 610 may have a sunken or concave shape. Here, the lens 610 may have a depression that is lowest, or deepest, at its center.

A bottom surface of the lens 610 may be flat except for the groove part. The groove part may be formed in approximately a circular cylindrical shape or a circular truncated cone shape, and a ceiling of the groove part may be curved. The ceiling may have a domelike shape. Therefore, the groove part may have a form in which a height thereof is the highest at a central portion thereof and is lower at its edges.

Next, paths of light through which the light supplied from the light source 600 moves while passing through the lens 610 will be described.

Figure 9:
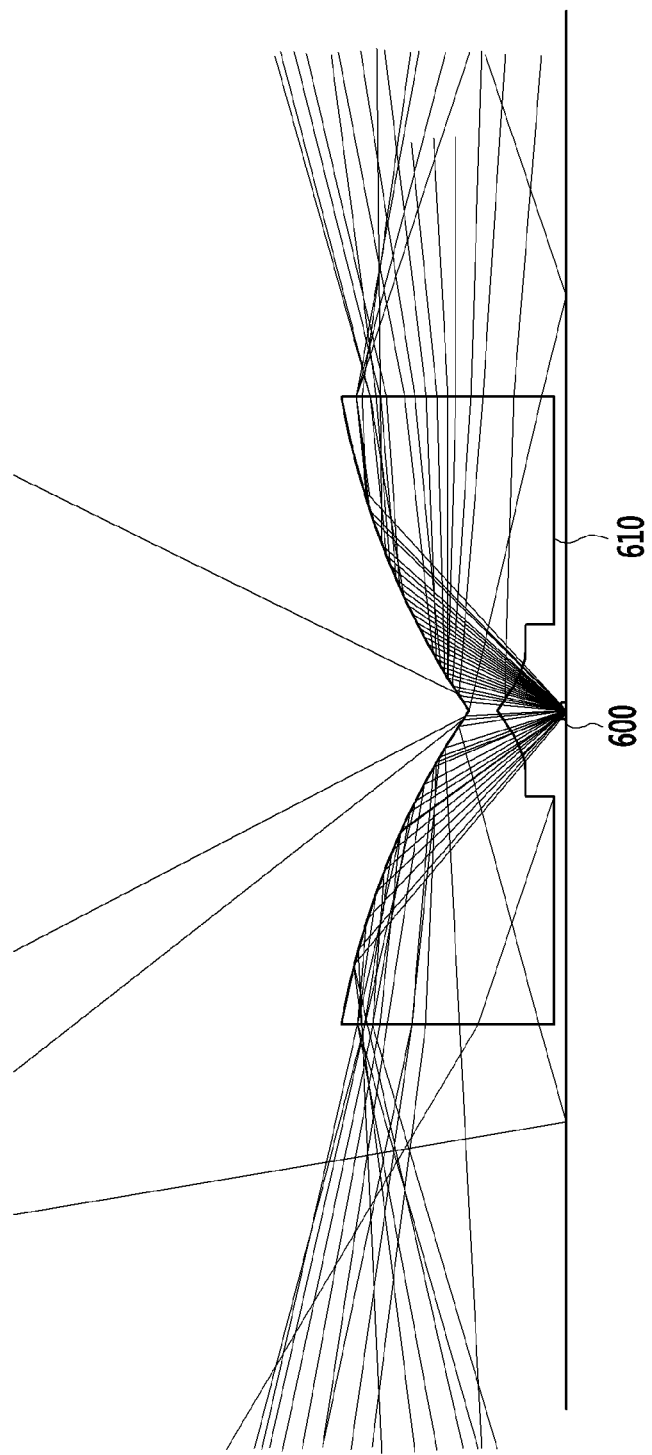
FIG. 9 is a view illustrating paths of light supplied from a light source.

FIG. 9 is a view showing paths of light supplied from a light source.

As shown in FIG. 9, most of the light supplied from the light source 600 is incident to a ceiling surface of the groove part of the lens 610. The light incident to the ceiling surface is refracted and then arrives at the top surface of the lens 610. The light is reflected from the top surface of the lens 610 depending on an incident angle thereof, and is then emitted through sides of the lens 610. As described above, the light source 600 supplies the light upwardly, and the lens 610 serves to emit the light supplied from the light source 600 to the sides thereof.

That is, the lens 610 is configured in a side emitting scheme. The light supplied from the light source 600 has various paths while passing through the lens 610.

The backlight assembly 500 may further include other optical components besides those shown. For example, an optical sheet may be further positioned on the light source 600. The optical sheet improves light collecting efficiency of the light emitted from the light source 600, and allows the light to have a generally more uniform distribution. The optical sheet may include a plurality of individual sheets, for example, a diffusion sheet, a prism sheet, and a protecting sheet that are sequentially stacked. The diffusion sheet diffuses the light emitted from the light source 600. The prism sheet collects the light diffused by the diffusion sheet in a direction perpendicular to a plane of the liquid crystal display panel 100. The light passing through the prism sheet is mostly incident perpendicular to the liquid crystal display panel 100. In addition, the protecting sheet may be disposed on the prism sheet, and protect the prism sheet from external impact.

Any one or more of any of the diffusion sheets, prism sheets, and protecting sheets may be included. Alternatively, in some cases, any one or more of the diffusion sheets, the prism sheets, and the protecting sheets may be omitted.

Next, various shapes of the holes formed in the second reflecting sheet of a backlight assembly according to an exemplary embodiment of the present invention will be described with reference to FIGS. 10 to 12.

Figure 10:
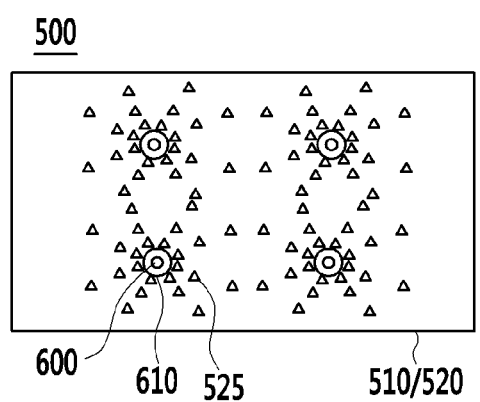
FIGS. 10 to 12 are plan views illustrating the backlight assembly according to an exemplary embodiment of the present invention.
Figure 11:
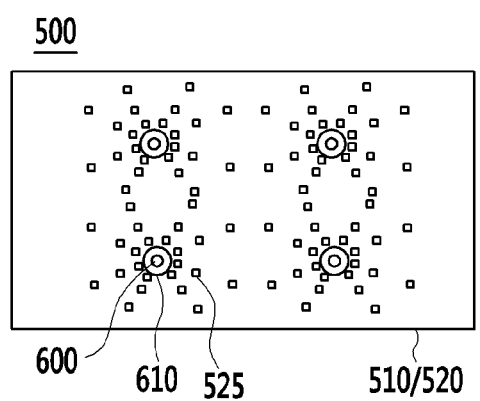
Figure 12:
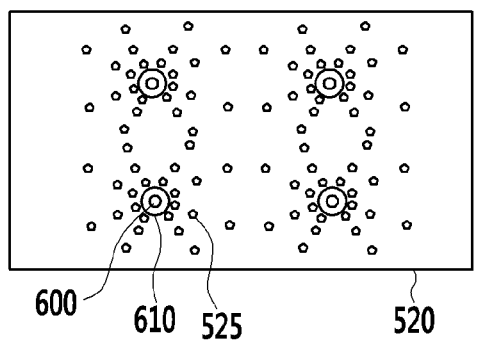

FIGS. 10 to 12 are plan views showing a backlight assembly according to an exemplary embodiment of the present invention. FIGS. 10 to 12 show various nonlimiting examples of shapes of the holes formed in the second reflecting sheet.

The second reflecting sheet 520 of the backlight assembly according to an exemplary embodiment of the present invention is formed to have approximately a quadrangular shape, and has a plurality of holes 525 formed therein.

The holes 525 are radially disposed around predetermined points. Here, the predetermined points may be areas at which the light sources 600 are positioned. That is, the plurality of holes 525 are disposed at positions extending outward from the light sources 600. The more distant from the light source 600, the lower the density of the holes 525.

The holes 525 may have generally triangular shapes, such as shown in FIG. 10. Alternatively, the holes 525 may have quadrangular shapes, as shown in FIG. 11, or pentagonal shapes, as shown in FIG. 12. That is, the holes 525 may have any shapes, for example oval shapes, polygonal shapes, and the like, in addition to the above-mentioned shapes.

Each of the holes 525 may have the same shape or may have different shapes. In addition, the holes 525 may each have the same size or may be of different sizes.

Next, a backlight assembly according to an exemplary embodiment of the present invention will be described with reference to FIG. 13.

Figure 13:
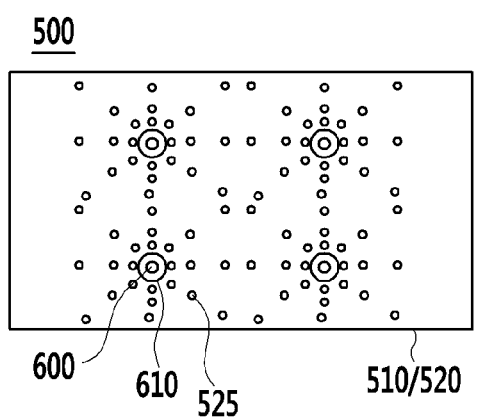
FIG. 13 is a plan view illustrating a backlight assembly according to an exemplary embodiment of the present invention.

Since the backlight assembly according to an exemplary embodiment of the present invention shown in FIG. 13 is substantially similar to that shown in FIGS. 2 and 4, description of like elements will be omitted. The backlight assembly according to the present exemplary embodiment differs in the distribution of holes in its second reflecting sheet, which will be further described below.

FIG. 13 is a plan view showing a backlight assembly according to an exemplary embodiment of the present invention.

As shown in FIG. 13, the backlight assembly 500 includes a first reflecting sheet 510, a second reflecting sheet 520, and light sources 600. The second reflecting sheet 520 may be positioned on the first reflecting sheet 510, and the light sources 600 may be positioned on the second reflecting sheet 520.

The second reflecting sheet 520 has an at least approximately quadrangular shape, and has a plurality of holes 525 formed therein.

The light sources 600 are positioned at corners of a quadrangle, and the holes 525 radiate outwardly from each light source 600.

For example, the holes 525 may be disposed at different locations, as can the light sources 600. Any arrangement and positions of both the light sources 600 and holes 525 is contemplated.

Here, distances between holes 525 positioned on the same line are increased as the holes become distant from the light sources 600. The rate at which distance between holes 525 increases with distance from light sources 600 may also vary. This rate of increase may vary by light source 600. That is, different light sources 600 may have differing distributions of holes 525.

In FIG. 13, the plurality of holes 525 are disposed so as to be extended in eight directions based on the light sources 600. However, this is only an example. That is, the holes 528 may extend along any number of directions.

In FIG. 13, the case in which the plurality of holes 525 are formed in a circular shape is shown. However, this is only an example. That is, the plurality of holes 525 may be formed in any other shape, including a polygonal shape such as a triangular shape, a quadrangular shape, a pentagonal shape, or the like, or may be formed in any other shape with arcuate sides, such as an oval shape.

In addition, different holes 525 may have the same shape or different shapes. In addition, different holes 525 may have same size or different sizes.

A surface roughness of the first reflecting sheet 510 is different from that of the second reflecting sheet 520. A surface roughness of the first reflecting sheet 510 is larger than that of the second reflecting sheet 520. An arithmetic average roughness Ra1 of the first reflecting sheet 510 is larger than an arithmetic average roughness Ra2 of the second reflecting sheet 520. A maximum height roughness Rmax1 of the first reflecting sheet 510 is larger than a maximum height roughness Rmax2 of the second reflecting sheet 520.

Next, a backlight assembly according to an exemplary embodiment of the present invention will be described with reference to FIG. 14.

Figure 14:
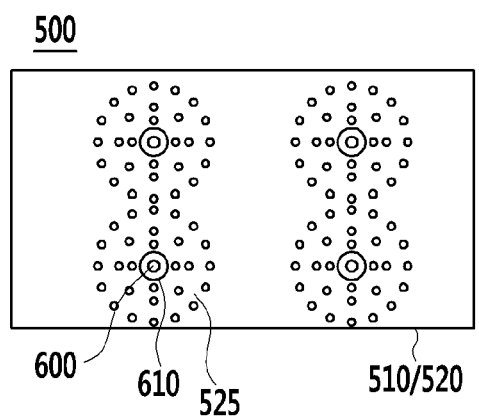
FIG. 14 is a plan view illustrating the backlight assembly according to an exemplary embodiment of the present invention.

Since the backlight assembly according to an exemplary embodiment of the present invention shown in FIG. 14 is similar to the backlight assembly of FIGS. 2 and 4, any redundant description will be omitted. The backlight assembly according to the present exemplary embodiment differs in its hole distribution, which will be further described below.

FIG. 14 is a plan view showing a backlight assembly according to an exemplary embodiment of the present invention.

As shown in FIG. 14, the backlight assembly 500 includes a first reflecting sheet 510, a second reflecting sheet 520, and light sources 600. The second reflecting sheet 520 may be positioned on the first reflecting sheet 510, and the light sources 600 may be positioned on the second reflecting sheet 520.

A surface roughness of the first reflecting sheet 510 is smaller than that of the second reflecting sheet 520. An arithmetic average roughness Ra1 of the first reflecting sheet 510 is about 0.1 µm or less, and an arithmetic average roughness Ra2 of the second reflecting sheet 520 is about 1.0 µm or more. A maximum height roughness Rmax1 of the first reflecting sheet 510 is smaller than a maximum height roughness Rmax2 of the second reflecting sheet 520. More specifically, the maximum height roughness Rmax1 of the first reflecting sheet 510 is about 1.5 µm or less, and the maximum height roughness Rmax2 of the second reflecting sheet 520 is about 10 µm or more.

The second reflecting sheet 520 has an at least approximately quadrangular shape, and has a plurality of holes 525 formed therein.

The plurality of holes 525 extend radially outward from predetermined points. Here, the predetermined points may be portions at which the light sources 600 are positioned. Here, the more distant from the light source 600, the higher the areal density of the holes 525.

Although the case in which the plurality of holes 525 are formed in a circular shape has been shown, the plurality of holes 525 are not limited to being formed in a circular shape, but instead may be formed in various shapes.

In previous embodiments, lenses were designed so that the light supplied from the light source is emitted through the sides of the lens. However, in this embodiment, lenses are designed to that the light supplied from the light source is emitted through a top surface of the lens. That is, the lens may be configured in a top emitting scheme. Either scheme may be implemented by various embodiments of the invention.

In addition, a roughness difference between the first reflecting sheet 510 and the second reflecting sheet 520 and a density distribution of the holes 525 formed in the second reflecting sheet 520 may be changed depending on a direction in which the light supplied from the light source is emitted through the lens. For example, the surface roughness of the first reflecting sheet 510 may be smaller than that of the second reflecting sheet 520, and the holes 525 may be disposed so as to have a density that decreases as the holes 525 become more distant from the light sources 600. Alternatively, the surface roughness of the first reflecting sheet 510 may be larger than that of the second reflecting sheet 520, and the holes 525 may be disposed so as to have a density that increases as the holes 525 become more distant from the light sources 600.

Next, a backlight assembly according to an exemplary embodiment of the present invention will be described with reference to FIG. 15.

Figure 15:
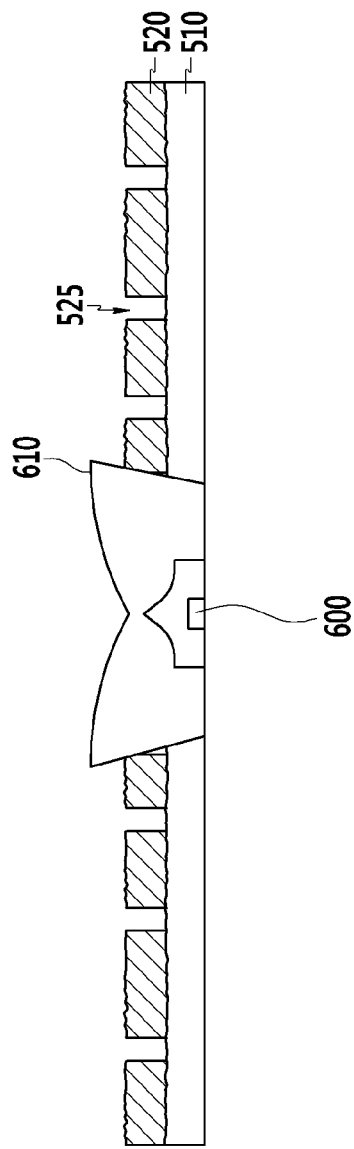
FIG. 15 is a cross-sectional view illustrating a backlight assembly according to an exemplary embodiment of the present invention.

Since the backlight assembly according to an exemplary embodiment of the present invention shown in FIG. 15 is substantially similar to the backlight assembly of FIGS. 2 and 4, any redundant description will be omitted. The backlight assembly according to the present exemplary embodiment differs in the positioning of its light sources and lenses, which will be further described below.

FIG. 15 is a cross-sectional view showing a backlight assembly according to an exemplary embodiment of the present invention.

As shown in FIG. 15, a predetermined groove may be formed in the first reflecting sheet 510 and the second reflecting sheet 520. The light source 600 and the lens 610 may be positioned in the groove.

The light source and the lens are positioned on the second reflecting sheet in previous exemplary embodiments, whereas in this embodiment, the light source and the lens are positioned within a groove or recess formed in the first and second reflecting sheets.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Furthermore, different features of the various embodiments, disclosed or otherwise understood, can be mixed and matched in any manner to produce further embodiments within the scope of the invention.

DESCRIPTION OF SYMBOLS

100: liquid crystal display panel
110: first substrate
210: second substrate
500: backlight assembly
510: first reflecting sheet
520: second reflecting sheet
525: hole
600: light source
610: lens

What is claimed is:
1. A backlight assembly comprising:
a first reflecting sheet having a first surface roughness;
a second reflecting sheet having a second surface roughness that is different from the first surface roughness and positioned above the first reflecting sheet; and
a light source emitting light,
wherein the second reflecting sheet has a plurality of holes formed therein, and
the plurality of holes of the second reflecting sheet each overlaps the first reflecting sheet at a portion of the first reflecting sheet that does not comprise any part of any hole of the first reflecting sheet, and wherein, in areas where the holes are formed a first light emitted from the plurality of light sources is reaching to and reflected by the first reflecting sheet with a first path, and in areas where the holes are not formed a second light is reflected by the second reflecting sheet with a second path, wherein the second reflecting sheet is integrally formed.

2. The backlight assembly of claim 1, wherein:
the first surface roughness is larger than the second surface roughness.

3. The backlight assembly of claim 2, wherein:
an arithmetic average roughness of the first reflecting sheet is about 1.0 µm or more.

4. The backlight assembly of claim 2, wherein:
a maximum height roughness of the first reflecting sheet is about 10 µm or more.

5. The backlight assembly of claim 2, wherein:
an arithmetic average roughness of the second reflecting sheet is about 0.1 µm or less.

6. The backlight assembly of claim 2, wherein:
a maximum height roughness of the second reflecting sheet is about 1.5 µm or more.

7. The backlight assembly of claim 1, wherein:
an areal density of the holes decreases with distance from the light source.

8. The backlight assembly of claim 1, wherein:
an areal density of the holes increases with distance from the light source.

9. The backlight assembly of claim 1, wherein:
the holes are arranged in groups around the light source.

10. The backlight assembly of claim 1, wherein:
the holes have at least one of a circular shape, an oval shape, a triangular shape, a quadrangular shape, and a polygonal shape.

11. The backlight assembly of claim 1, wherein:
the first surface roughness is smaller than the second surface roughness.

12. The backlight assembly of claim 11, wherein:
an areal density of the holes decreases with distance from the light source.

13. The backlight assembly of claim 11, wherein:
an areal density of the holes increases with distance from the light source.

14. The backlight assembly of claim 1, further comprising:
a lens positioned above and enclosing the light source.

15. The backlight assembly of claim 14, wherein:
the light source is configured to direct light in a vertical direction at least approximately perpendicular to an upper surface of the reflecting sheets, and the lens is configured to emit the light supplied from the light source through sides thereof.

16. The backlight assembly of claim 14, wherein:
the lens is configured to emit light supplied from the light source through an upper surface thereof.

17. A liquid crystal display device comprising:
a backlight assembly; and
a liquid crystal display panel positioned above the backlight assembly;
wherein the backlight assembly includes:
a first reflecting sheet having a first surface roughness;
a second reflecting sheet having a second surface roughness that is different from the first surface roughness and positioned above the first reflecting sheet; and
a light source emitting light,
wherein the second reflecting sheet has a plurality of holes formed therein,
the plurality of holes of the second reflecting sheet each overlaps the first reflecting sheet at a portion of the first reflecting sheet that does not comprise any part of any hole of the first reflecting sheet, and
wherein, in areas where the holes are formed a first light emitted from the plurality of light sources is reaching to and reflected by the first reflecting sheet with a first path, and in areas where the holes are not formed a second light is reflected by the second reflecting sheet with a second path wherein the second reflecting sheet is integrally formed.

18. The liquid crystal display device of claim 17, wherein:
the first surface roughness is larger than the second surface roughness.

19. The liquid crystal display device of claim 18, wherein:
an areal density of the holes decreases with distance from the light source.

20. The liquid crystal display device of claim 18, wherein:
an areal density of the holes increases with distance from the light source.

21. The liquid crystal display device of claim 17, wherein:
the first surface roughness is smaller than the second surface roughness.

22. The liquid crystal display device of claim 21, wherein:
an areal density of the holes decreases with distance from the light source.

23. The liquid crystal display device of claim 21, wherein:
an areal density of the holes increases with distance from the light source.

24. The liquid crystal display device of claim 17, wherein:
the backlight assembly further includes a lens positioned above and enclosing the light source.

25. The liquid crystal display device of claim 24, wherein:
the light source is configured to direct light in a vertical direction at least approximately perpendicular to an upper surface of the reflecting sheets, and the lens is configured to emit the light supplied from the light source through sides thereof.

26. The liquid crystal display device of claim 24, wherein:
the lens is configured to emit light supplied from the light source through an upper surface thereof.

27. The backlight assembly of claim 1, wherein:
the holes are positioned so that successive holes extend radially outward from the light source.

28. The backlight assembly of claim 17, wherein:
the holes are positioned so that successive holes extend radially outward from the light source.

29. The backlight assembly of claim 1, wherein each of the plurality of holes are separate from each other, are circular, have a same size as each other, and do not surround any area of the second reflecting sheet where holes are not formed.

30. The backlight assembly of claim 1, wherein the light source is disposed on the second reflecting sheet.

* * * * *